(12) United States Patent
Yagyu

(10) Patent No.: US 8,908,068 B2
(45) Date of Patent: Dec. 9, 2014

(54) IMAGE PICKUP DEVICE AND IMAGE PICKUP UNIT TO FORM COMPOSITE IMAGE

(75) Inventor: Genta Yagyu, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 13/422,501

(22) Filed: Mar. 16, 2012

(65) Prior Publication Data

US 2012/0262606 A1 Oct. 18, 2012

(30) Foreign Application Priority Data

Apr. 13, 2011 (JP) ................................. 2011-089432

(51) Int. Cl.
| | |
|---|---|
| H04N 3/14 | (2006.01) |
| H04N 5/335 | (2011.01) |
| H04N 9/04 | (2006.01) |
| H04N 5/262 | (2006.01) |
| H04N 5/369 | (2011.01) |

(52) U.S. Cl.
CPC .......... *H04N 5/2621* (2013.01); *H04N 5/3696* (2013.01); *H04N 9/04* (2013.01)
USPC ...................................................... 348/272

(58) Field of Classification Search
USPC ................... 348/272, 273, 275, 280, 281, 282
See application file for complete search history.

(56) References Cited

U.S. PATENT DOCUMENTS

| | | | | |
|---|---|---|---|---|
| 6,690,049 | B2 * | 2/2004 | Suzuki et al. | 257/294 |
| 7,468,746 | B2 * | 12/2008 | Sugimoto | 348/229.1 |
| 7,612,811 | B2 * | 11/2009 | Takeuchi et al. | 348/272 |
| 8,478,123 | B2 * | 7/2013 | Cao et al. | 396/333 |
| 2004/0145672 | A1 * | 7/2004 | Sugimoto | 348/363 |
| 2005/0062863 | A1 * | 3/2005 | Takeuchi et al. | 348/272 |
| 2008/0055500 | A1 * | 3/2008 | Maeda | 349/15 |
| 2009/0213256 | A1 * | 8/2009 | Kudoh | 348/302 |
| 2010/0245633 | A1 * | 9/2010 | Hanada | 348/246 |

FOREIGN PATENT DOCUMENTS

JP 2010-081002 4/2010

* cited by examiner

*Primary Examiner* — Nicholas Giles
(74) *Attorney, Agent, or Firm* — Sony Corporation

(57) ABSTRACT

An image pickup device includes a first pixel and a second pixel. The first pixel includes a first light-shielding portion and a first light-receiving portion in order from an object. The first pixel outputs a first image signal, and the first light-shielding portion includes a first opening. The second pixel includes a second light-shielding portion and a second light-receiving portion in order from the object. The second pixel outputs a second image signal, and the second light-shielding portion includes a second opening that has area smaller than area of the first opening.

8 Claims, 13 Drawing Sheets

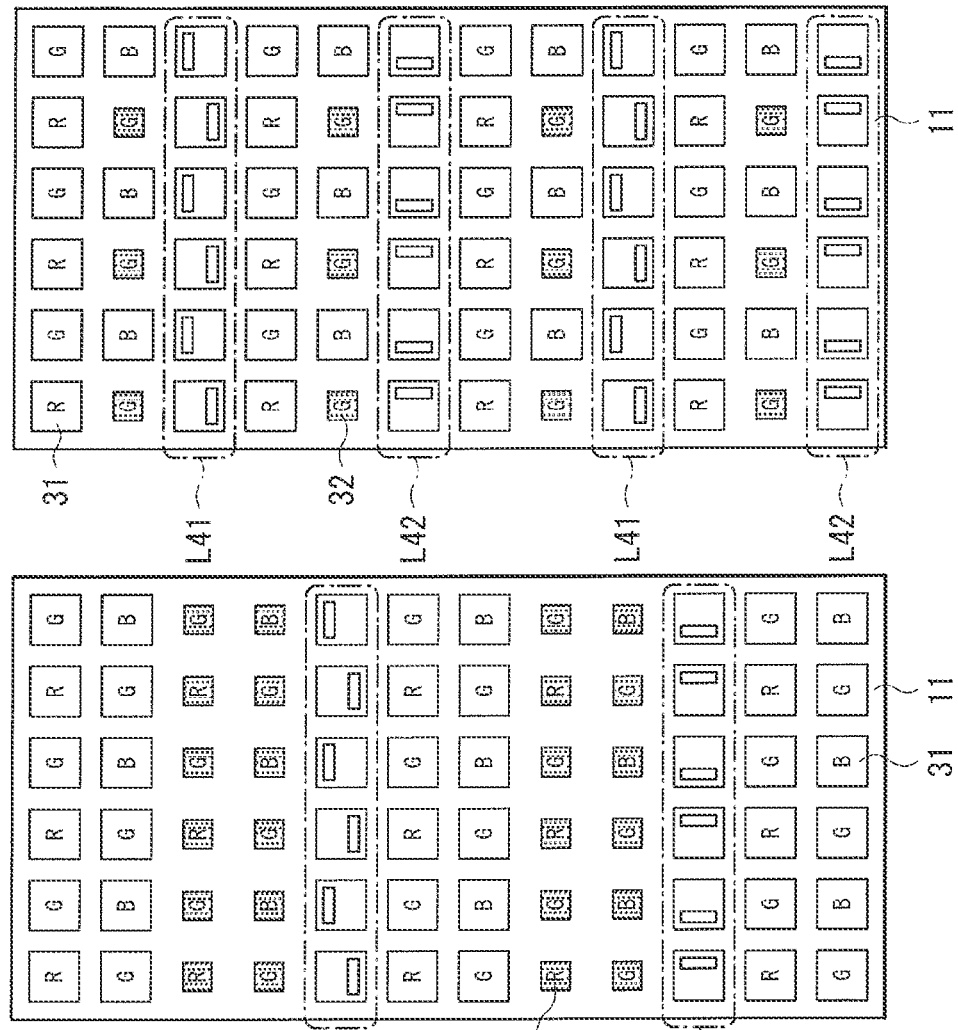
FIG. 12A
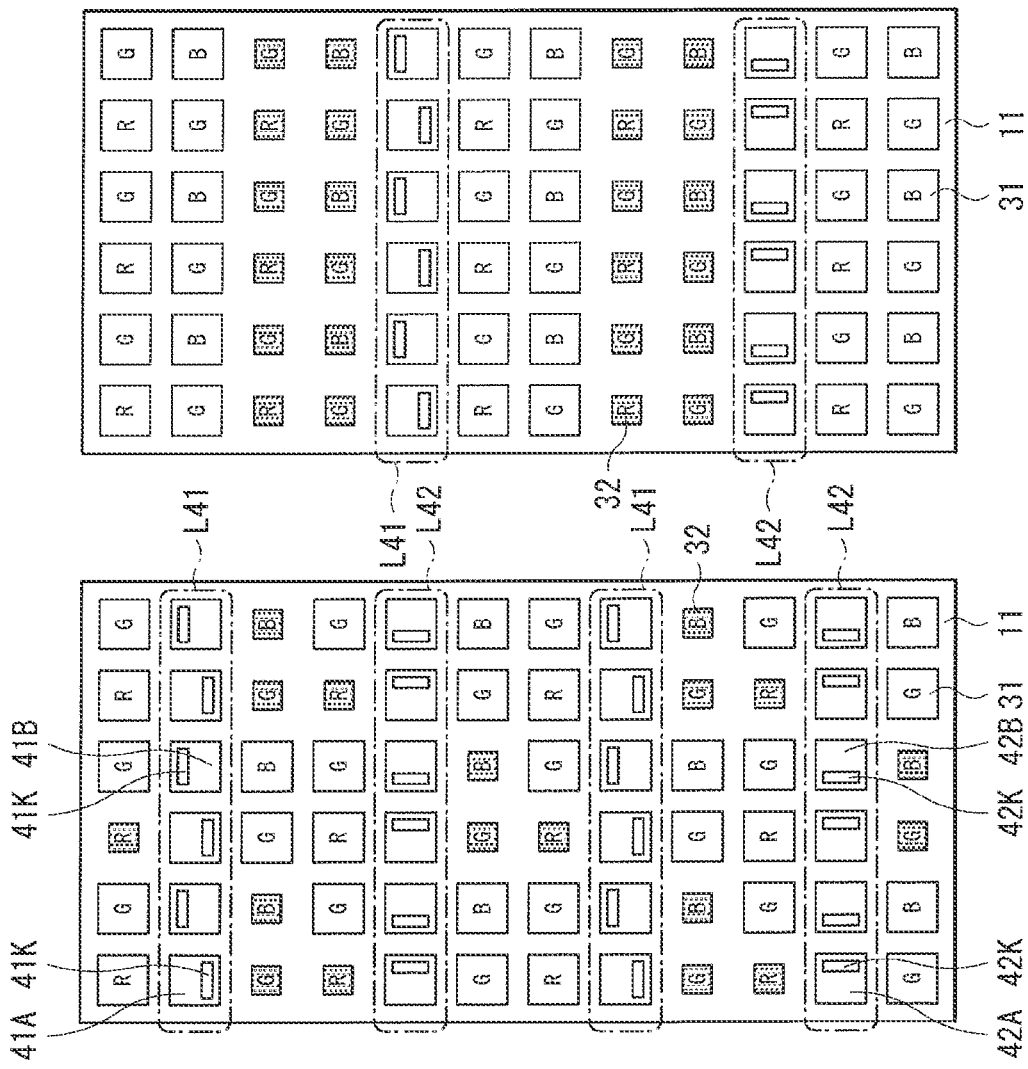
FIG. 12B
FIG. 12C

IMAGE PICKUP DEVICE AND IMAGE PICKUP UNIT TO FORM COMPOSITE IMAGE

BACKGROUND

The present disclosure relates to an image pickup device having a plurality of pixels and an image pickup unit including the image pickup device.

In a typical photographic expression, a technique is known, in which a lens of large diameter having a small F value is used for a photographing optical system, so that a background image is blurred to emphasize a main photographic subject such as a person. However, since the lens of large diameter has a relatively shallow focal depth, accurate focusing is necessary. That is, use of the lens of large diameter tends to cause out-of-focusing, leading to degradation in resolution. In addition, aberration (for example, spherical aberration) of marginal light is often insufficiently corrected in the lens of large diameter. In such a case, original advantages of the large diameter are hard to be fully used.

Under such circumstances, high-frequency components defining a photographed image are extracted for each of colors through the use of axial chromatic aberration occurring in the photographing optical system so that the focal depth is adjusted (for example, see Japanese Unexamined Patent Application Publication No. 2010-81002).

SUMMARY

However, the technique disclosed in Japanese Unexamined Patent Application Publication No. 2010-81002 mentioned above is hard to be applied to zoom lenses. This is because magnification operation causes variations in a rate of occurrence of axial chromatic aberration, so that appropriate axial chromatic aberration for adjustment of the focal depth may not be obtained at a predetermined focal distance. Moreover, a photographing optical system including a fixed-focal-length lens also involves occurrence of axial chromatic aberration, causing degeneration of a photographed image such as bleeding.

It is desirable to provide an image pickup device that meets wide variety of image expressions, allowing, for example, formation of a clear image of a main photographic subject while blurring the background, and an image pickup unit including the image pickup device.

An image pickup unit according to an embodiment of the disclosure includes: a first pixel including a first light-shielding portion and a first light-receiving portion in order from an object, the first pixel outputting a first image signal, and the first light-shielding portion including a first opening; a second pixel including a second light-shielding portion and a second light-receiving portion in order from the object, the second pixel outputting a second image signal, and the second light-shielding portion including a second opening having area smaller than area of the first opening; and a composition section combining a first image based on the first image signal with a second image based on the second image signal to form a composite image.

In the image pickup unit according to the embodiment of the disclosure, the first pixel capture an incident beam having a relatively large converging angle, and the second pixel capture an incident beam having a relatively small converging angle. In addition, the composition section forms a desired composite image on the basis of the first image captured by the first pixel and the second image captured by the second pixel.

An image pickup device according to the embodiment of the disclosure includes: a first pixel including a first light-shielding portion and a first light-receiving portion in order from an object, the first pixel outputting a first image signal, and the first light-shielding portion including a first opening; and a second pixel including a second light-shielding portion and a second light-receiving portion in order from the object, the second pixel outputting a second image signal, and the second light-shielding portion including a second opening having area smaller than area of the first opening.

In the image pickup device according to the embodiment of the disclosure, the first pixel capture an incident beam having a relatively large converging angle, and the second pixel capture an incident beams having a relatively small converging angle.

According to the image pickup unit and the image pickup device according to the embodiments of the disclosure, the composite image is provided as a combination of the first image having a shallow depth of field based on the first image signal derived from the first pixel and the second image having a deep depth of field based on the second image signal derived from the second pixel.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 12A to 12C are plan diagrams illustrating a fourth modification of the pixel arrangement in the image pickup device.

DETAILED DESCRIPTION OF EMBODIMENT

Hereinafter, an embodiment of the disclosure will be described in detail with reference to the accompanying drawings.

[Overall Configuration of Image Pickup Unit]

Figure 1:
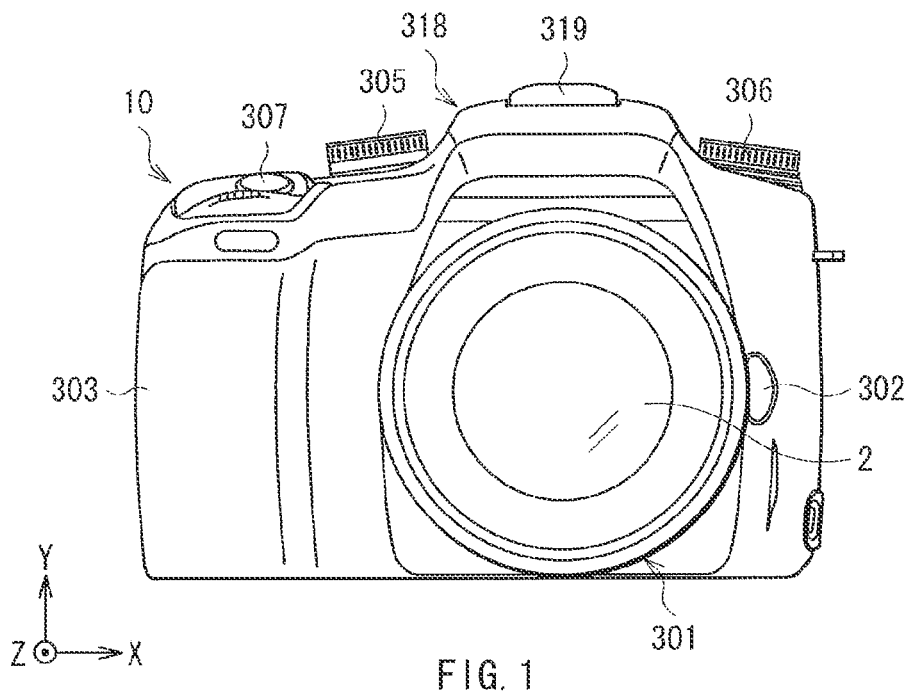
FIG. 1 is a front view illustrating appearance of an image pickup unit including an image pickup device according to an embodiment of the disclosure.
Figure 2:
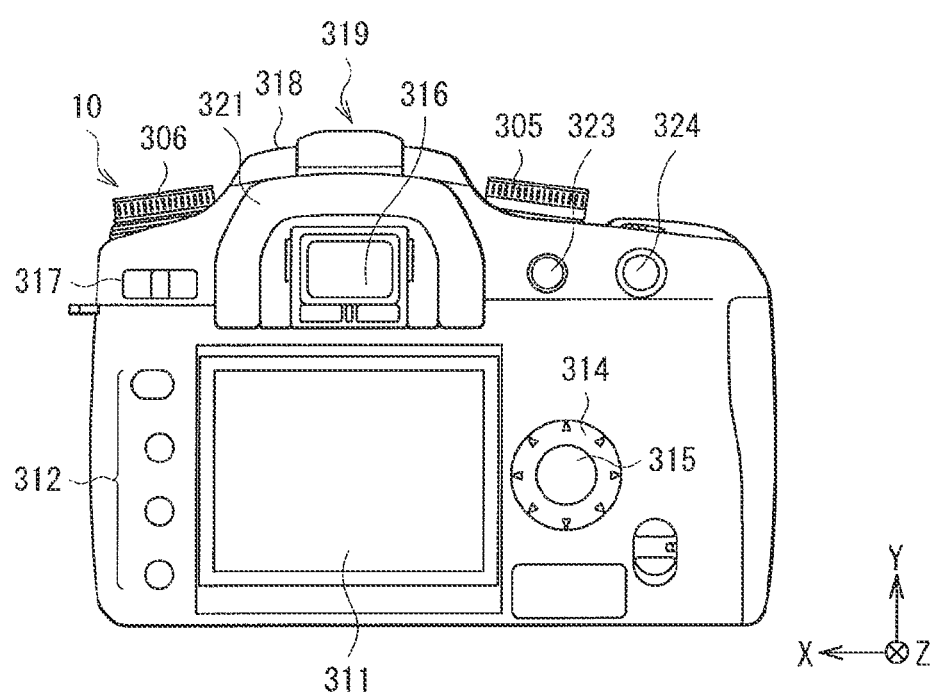
FIG. 2 is a rear view illustrating another appearance of the image pickup unit shown in FIG. 1.
Figure 3:
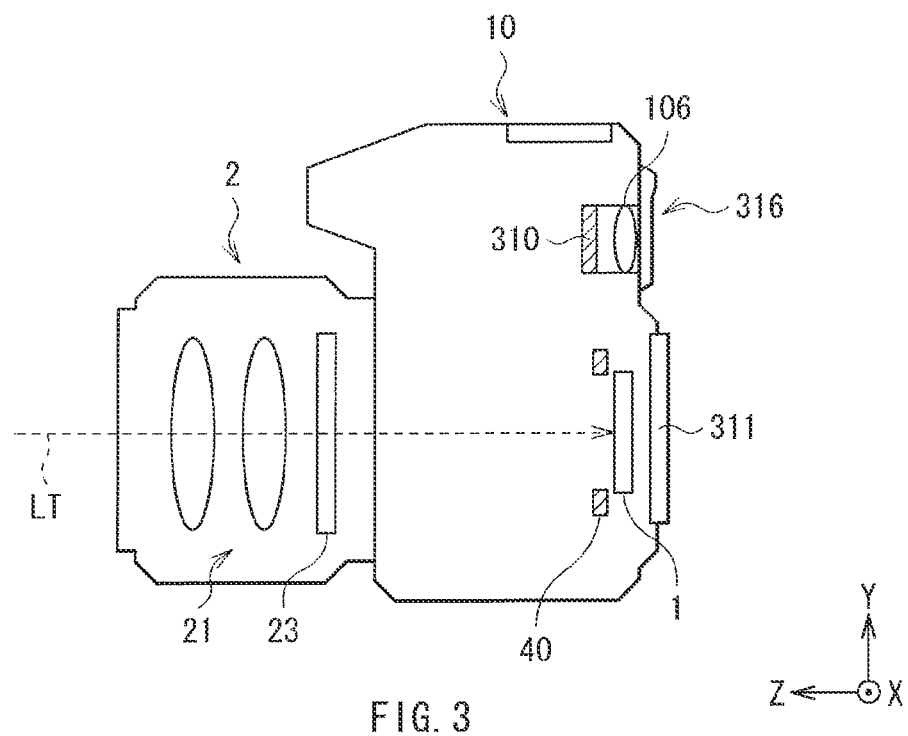
FIG. 3 is a schematic view illustrating an internal structure of the image pickup unit shown in FIG. 1.
Figure 4:
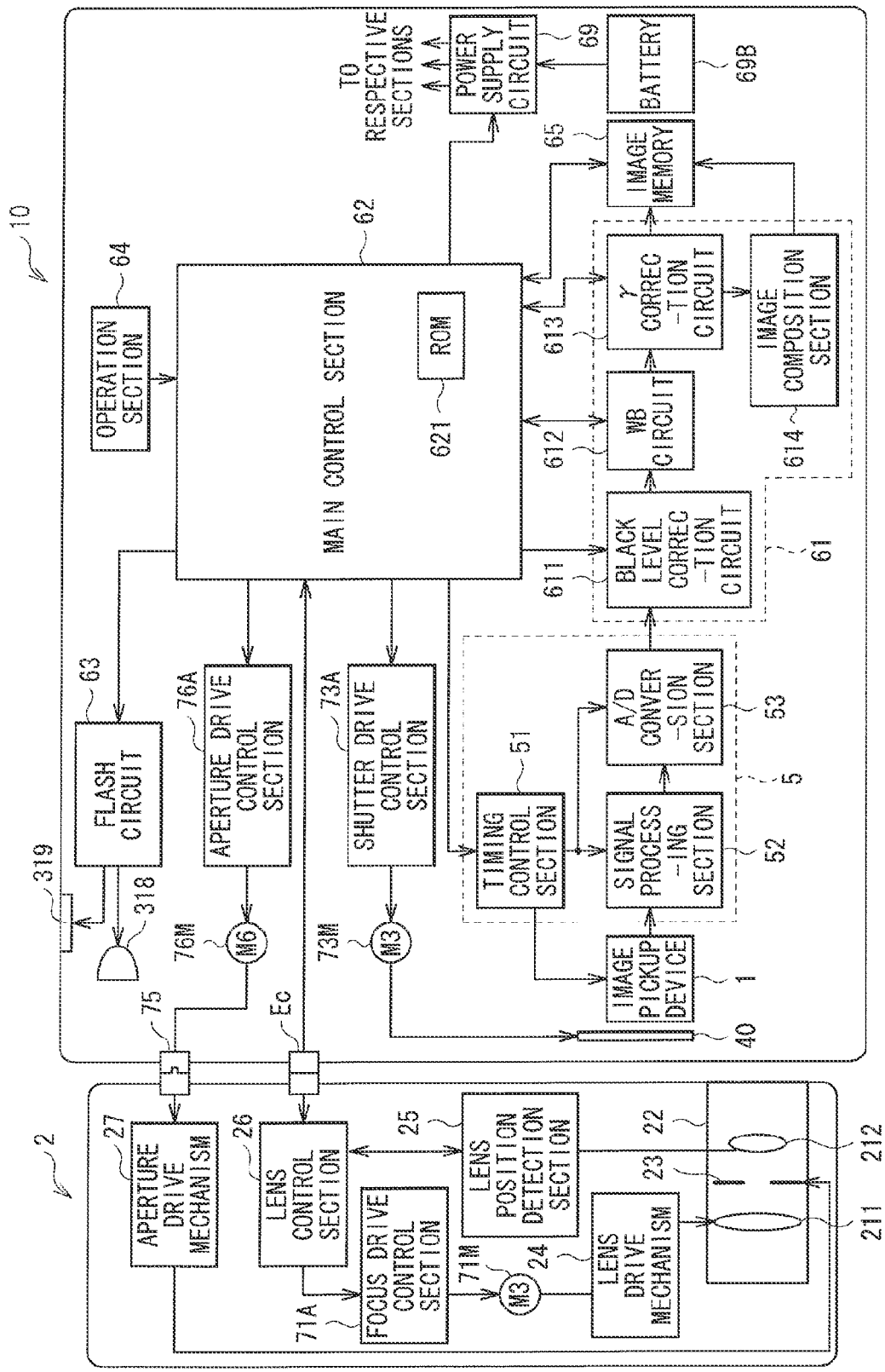
FIG. 4 is a block diagram illustrating an electric configuration of the image pickup unit shown in FIG. 1.

FIGS. 1 and 2 are a front view (FIG. 1) and a rear view (FIG. 2), respectively, illustrating an overall configuration of an image pickup unit including an image pickup device 1 according to the present embodiment. FIG. 3 is a schematic diagram illustrating a sectional configuration of the image pickup unit. FIG. 4 is a block diagram explaining a mechanism of the image pickup unit.

This image pickup unit is, for example, a digital still camera of a single-lens reflex type, where a detachable image pickup lens 2 is mounted on a surface (front surface) closer to a photographic subject of a main body 10 as an outer casing.

As shown in FIG. 1, a mount section 301 mounted with the image pickup lens 2, a lens replacement button 302 disposed on a right side of the mount section 301, and a grip section 303 to be gripped by a photographer are provided on the front surface of the main body 10. A flash section 318 and a connection terminal section 319 located above the image pickup lens 2, a mode setting dial 305 and a control-value setting dial 306 disposed across the sections 318 and 319, and a shutter button 307 located above the grip section 303 are provided on a top of the main body 10.

As shown in FIG. 2, a liquid crystal display (LCD) 311, a setting button group 312 disposed at the left of the LCD 311, a cross key 314 disposed at the right of the LCD 311, and a push button 315 disposed at the center of the cross key 314 are provided on the back of the main body 10. An electronic view finder (EVF) 316 and an eyecup 321 enclosing the EVF 316 are disposed above the LCD 311. Furthermore, a main switch 317 is provided at the left of the EVF 316, and an exposure correction button 323 and an automatic exposure (AE) locking button 324 are provided at the right of the EVF 316.

The mount section 301 has a connector Ec (see FIG. 4) for electric connection between the main body 10 and the image pickup lens 2 mounted on the mount section 301, and has a coupler 75 (see FIG. 4) for mechanical connection between them, for example.

The lens replacement button 302 is depressed for detaching the image pickup lens 2 from the mount section 301.

The grip section 303, which is gripped by a user for photographing, has a surface irregularity in accordance with a shape of fingers to improve fitness. It is to be noted that a battery accommodation room and a card accommodation room (not shown) are provided within the grip section 303. The battery accommodation room accommodates a battery 69B (see FIG. 4) as a power source of the camera, and the card accommodation room detachably accommodates a memory card (not shown) to be written with data of a photographed image.

The mode setting dial 305 and the control-value setting dial 306 each include a disc-like member that is rotatable in a plane along the top of the main body 10. The mode setting dial 305 is provided to alternatively select modes or functions incorporated in the image pickup unit, such as an autoexposure (AE) control mode, an autofocus (AF) control mode, a variety of photographing modes such as a still-image photographing mode and a continuous photographing mode, and a reproduction mode for reproduction of recorded images. The control-value setting dial 306 is provided to set a control value for each of functions incorporated in the image pickup unit.

The shutter button 307 is a depression switch that is manipulated into either a halfway depressed state where the shutter button 307 is depressed halfway or a fully depressed state where the shutter button 307 is fully depressed. In the still-image photographing mode, the shutter button 307 is depressed halfway, activating preparation operation for photographing of a still image of a photographic subject (preparation operation such as setting of an exposure control value and detection of a focal point). The shutter button 307 is then fully depressed, activating photographing operation (sequential operation where the image pickup device 1 (see FIG. 3) is exposed, and image signals obtained through such exposure are subjected to a predetermined image processing, and such processed image signals are stored in a memory card).

The LCD 311, which includes a color liquid crystal panel performing image display, displays images captured by the image pickup device 1 and reproduces recorded images, and displays a screen for setting of functions and modes incorporated in the image pickup unit. It is to be noted that other suitable display such as an organic EL display and a plasma display can be used in place of the LCD 311.

The setting button group 312 is an operation section allowing operation for various functions incorporated in the image pickup unit. The setting button group 312 includes such as a selection determination switch for determination of content selected in a menu screen displayed on the LCD 311, a selection cancelling switch, a menu display switch for change of the content in the menu screen, a display on/off switch, and a zoom switch.

The cross key 314 includes a ring-shaped member having a plurality of depression portions (portions with triangle marks in FIG. 2) arranged at a constant space in a circumferential direction such that depression operation to each depression portion is detected by each of unillustrated contacts (switches) provided in correspondence to the depression portions. The push button 315 is disposed in the center of the cross key 314. The cross key 314 and the push button 315 are provided to input, for example, an instruction for change of a photographing magnification (shift of a zoom lens 212 (see FIG. 4) in a wide-angle direction or a zoom-in direction), an instruction for frame advance of recorded images to be reproduced on the LCD 311, and an instruction for setting of photographing conditions, such as an aperture value, shutter speed, and flash firing.

The EVF 316, which includes a liquid crystal panel 310 (see FIG. 3), displays images captured by the image pickup device 1, and reproduces recorded images, for example. The EVF 316 or the LCD 311 performs live view (preview) display where a photographic subject is displayed in a moving image fashion on the basis of image signals generated sequentially by the image pickup device 1 before main photographing (photographing for image recording), allowing a user to view the photographic subject to be actually photographed by the image pickup device 1.

The main switch 317 includes a two-position slide switch that is horizontally slidable. For example, when the main switch 317 is set at the left, power of the image pickup unit is turned on, and when the main switch 317 is set at the right, the power is turned off.

The flash section 318 is configured as a popup-type built-in flash. In the case where an external flash is mounted on the main body 10, the connection terminal section 319 is used for connection.

The eyecup 321 is a light-shielding component that blocks light from the surrounding to the EVF 316.

The exposure correction button 323 is a manual button for adjustment of exposure values, such as the aperture value and shutter speed. The AE locking button 324 is a button for fixing of exposure.

The image pickup lens 2 functions as a lens window that captures light (a light image) derived from a photographic subject, and functions as an image pickup system that guides the light derived from the photographic subject to the image pickup device 1 disposed within the main body 10. The image pickup lens 2 is detached from the main body 10 by depressing the above-described lens replacement button 302.

The image pickup lens 2 includes a lens group 21 including a plurality of lenses arranged in series along a light axis LT as shown in FIG. 4. The lens group 21 includes, for example, a focus lens 211 to be moved along the light axis LT for adjustment of a focal point, and a zoom lens 212 to be moved along the light axis LT for magnification. In addition, the image pickup lens 2 has a rotatable operational ring along an outer circumference of its barrel at an appropriate place on the outer circumference. The zoom lens 212 moves along the light axis in a direction depending on a rotational direction of the operational ring and by a distance depending on a rotational distance thereof so as to be set at a zoom magnification (photographing magnification) corresponding to its arrival position, either manually or automatically.

[Internal Configuration of Image Pickup Unit]

An internal configuration of the image pickup unit according to the embodiment is now described. The main body 10 accommodates, for example, the image pickup device 1, a shutter unit 40, and the EVF 316, as shown in FIG. 3.

Figure 5A:
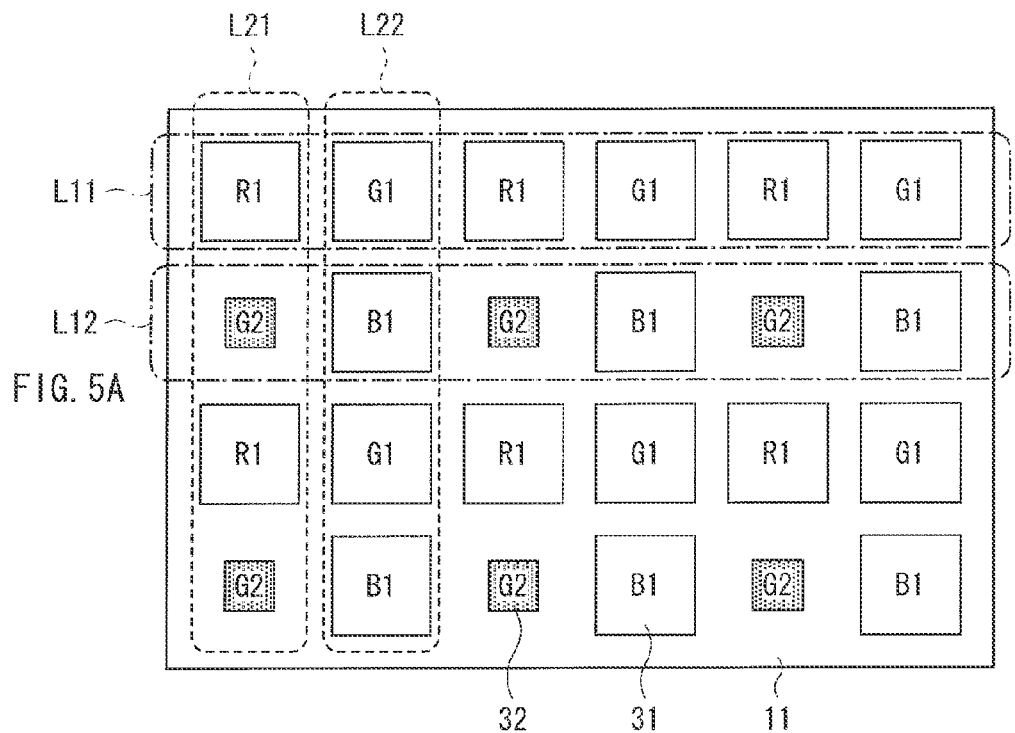
FIGS. 5A and 5B are plan diagrams each illustrating a pixel arrangement in the image pickup device in the image pickup unit shown in FIG. 1.
Figure 5B:
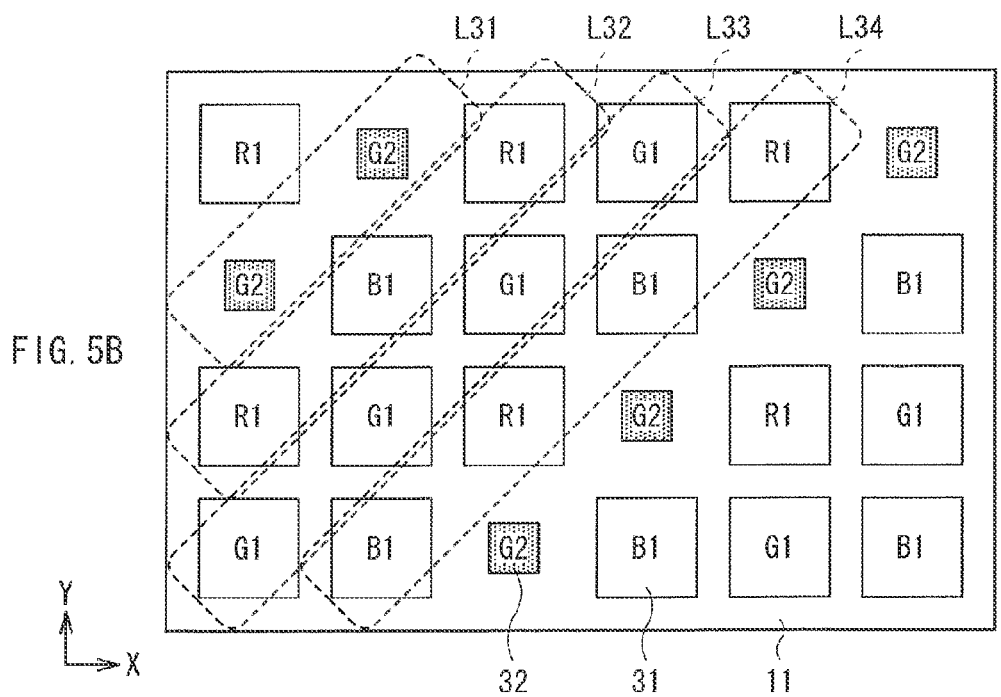

The image pickup device 1 is, for example, a solid image pickup device such as a CCD image sensor and a CMOS image sensor, and includes a plurality of pixels arranged on a substrate 11, for example, as shown in FIGS. 5A and 5B. FIGS. 5A and 5B are plan views each illustrating part of a specific example of a pixel arrangement in the image pickup device 1 according to the embodiment. The substrate 11 extends along a surface orthogonal to the light axis LT. The plurality of pixels of the image pickup device 1 are classified into wide-opening pixels 31, each having an opening 14K1 (described below) having a relatively large area, and narrow-opening pixels 32, each having an opening 14K2 (described below) having a smaller area than the wide-opening pixel 31. In FIGS. 5A and 5B, size of each of rectangles indicating the wide-opening pixel 31 and the narrow-opening pixel 32 represents size of each of the openings 14K1 and 14K2. Each of the wide-opening pixel 31 and the narrow-opening pixel 32 receives beams derived from a photographic subject through the image pickup lens 2, and converts the beams into analog electric signals (image signals) corresponding to light of respective color components of red (R), green (G), and blue (B), and outputs the image signals. Hereinafter, the wide-opening pixels 31 that output the image signals corresponding to light of the color components of red (R), green (G), and blue (B) are denoted as pixels R1, G1, and B1, and the narrow-opening pixels 32 that output the image signals corresponding to light of the color components of red (R), green (G), and blue (B) are denoted as pixels R2, G2, and B2. This is the same in other figures.

In FIGS. 5A and 5B, the pixel arrangement is a so-called Bayer arrangement. In the pixel arrangement shown in FIG. 5A, a plurality of pixel arrays L11 and a plurality of pixel arrays L12, each extending in an X direction (horizontal direction), are alternately arranged in a Y direction (vertical direction). In the pixel arrays L11, a plurality of pixels R1 and a plurality of pixels G1 are alternately arranged in the X direction. In the pixel arrays L12, a plurality of pixels G2 and a plurality of pixels B1 are alternately arranged in the X direction. The pixels R1 and the pixels G1 in the pixel arrays L11 adjoin the pixels G2 and the pixels B1 in the pixel arrays L12, respectively, in the Y direction. Specifically, pixel arrays L21, in which the pixels R1 and the pixels G2 are alternately arranged in the Y direction, and pixel arrays L22, in which the pixels G1 and the pixels B1 are alternately arranged in the Y direction, are alternately arranged in the X direction. As a result, in FIG. 5A, the pixels G2 serving as the narrow-opening pixels, are alternately disposed across one of the pixels B1, R1, and G1 serving as the wide-opening pixels in any of X, Y, and oblique directions.

In the pixel arrangement shown in FIG. 5B, pixel arrays L31, L32, L33, and L34, each extending in a diagonally right-up direction inclined with respect to each of the X and Y directions, are sequentially arranged in a diagonally left-up direction orthogonal to the extending direction. In the pixel array L31, a plurality of pixels G2 are arranged along the diagonally right-up direction. In the pixel arrays L32 and L34, a plurality of pixels R1 and a plurality of pixels B1 are alternately arranged along the diagonally right-up direction. In the pixel array L34, a plurality of pixels G1 are arranged along the diagonally right-up direction. In the example shown in FIG. 5B, the number of the pixels G1 serving as the wide-opening pixels is the same as the number of the pixels G2 serving as the narrow-opening pixels, in any of the pixel arrays extending in the X direction.

Figure 6A:
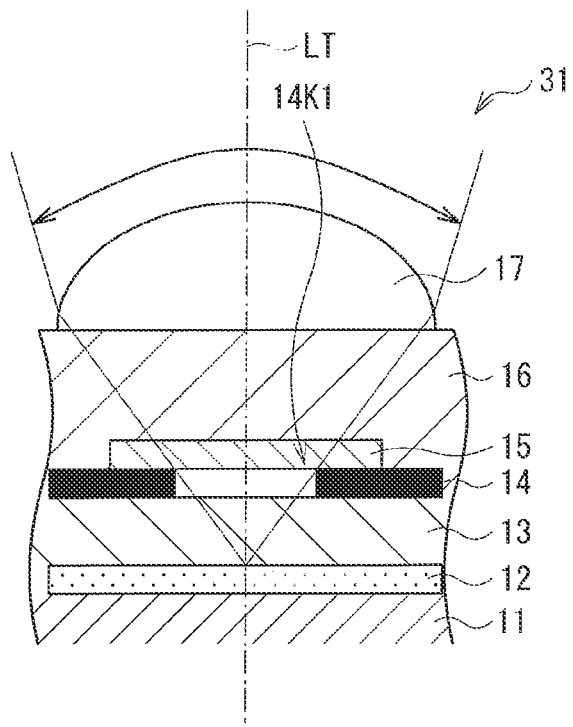
FIGS. 6A and 6B are sectional views each illustrating a sectional structure of a pixel shown in FIGS. 5A and 5B.
Figure 6B:
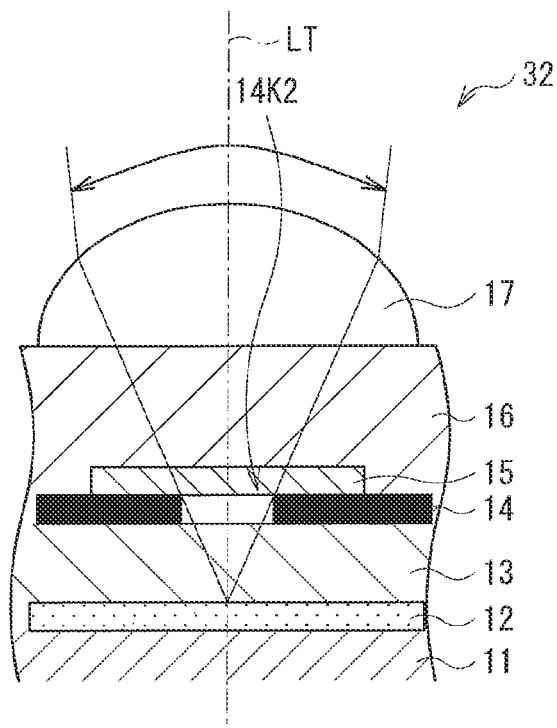

FIGS. 6A and 6B illustrate sectional structures of the wide-opening pixel 31 and the narrow-opening pixel 32, respectively. As shown in FIGS. 6A and 6B, each of the wide-opening pixel 31 and the narrow-opening pixel 32 has a structure where an photoelectric conversion section 12, a planarization film 13, a light-shielding film 14 having an opening 14K (opening 14K1 or 14K2) in the vicinity of its center, a color filter 15, a planarization film 16, and a micro-lens 17 are stacked in this order on the substrate 11. In each of the wide-opening pixel 31 and the narrow-opening pixel 32, the photoelectric conversion section 12 is disposed in a region where the center thereof is overlapped with the opening 14K. The opening 14K2 of the narrow-opening pixel 32 has a smaller areal occupancy than the opening 14K1 of the wide-opening pixel 31, as described before. Consequently, a higher percent of incident light through the image pickup lens 2 is blocked by the light-shielding film 14 in the narrow-opening pixel 32 than in the wide-opening pixel 31. Specifically, the photoelectric conversion section 12 of the narrow-opening pixel 32 actually receives incident light that is limited to components having small converging angles as compared with the wide-opening pixel 31. As a result, as compared with in the wide-opening pixel 31, the narrow-opening pixel 32 receives only incident light which has a deep depth of field and which is relatively successfully subjected to aberration correction. As a result, the narrow-opening pixel 32 acquires images in higher resolution. In the embodiment, in particular, the number of the pixels G outputting image signals corresponding to light of a green component is two times as large as the number of each of the pixels R and the pixels B, and part of the pixels G are provided as the narrow-opening pixels 32. Accordingly, a viewer recognizes images in high resolution.

The shutter unit 40 is provided in front (on a side closer to an object) of the image pickup device 1. The shutter unit 40 has, for example, a curtain component that moves in a vertical direction, and transmits or blocks incident light through the image pickup lens 2 in response to open/close operation of the curtain component.

The EVF 316 includes the liquid crystal panel 310 and an eyepiece 106. The liquid crystal panel 310 is, for example, a color liquid crystal panel that performs image display, and displays images captured by the image pickup device 1. The eyepiece 106 guides a photographic subject image displayed on the liquid crystal panel 310 to the outside. This allows a viewer to view the photographic subject image.

[Electric Configuration of Image Pickup Unit]

An electric configuration of the image pickup unit is now described with reference to FIG. 4.

As shown in FIG. 4, the image pickup lens 2 includes a lens drive mechanism 24, a lens position detection section 25, a lens control section 26, and an aperture drive mechanism 27, in addition to the lens group 21, for example.

(Electric Configuration of Image Pickup Lens)

In the lens group 21, the focus lens 211, the zoom lens 212, and an aperture 23 for adjustment of the quantity of light incident to the image pickup element 1 provided in the main body 10 are accommodated within a barrel 22 and disposed along the light axis LT. The lens group 21 captures light derived from a photographic subject to form an optical image on a surface of the image pickup device 1. The image pickup lens 2 further has a focus control drive section 71A and an actuator 71M so as to move the focus lens 211 along the light axis LT for adjustment of a focal point.

The focus control drive section 71A generates a drive control signal for the AF actuator 71M on the basis of an AF control signal supplied from a main control section 62 provided in the main body 10 through the lens control section 26. The AF actuator 71M, including such as a stepping motor, supplies a lens driving force to the lens drive mechanism 24.

The lens drive mechanism 24, which includes, for example, a helicoid and an unillustrated gear for rotation of the helicoid, receives the driving force from the AF actuator 71M to move the focus lens 211 and others along the light axis LT. It is to be noted that a moving direction and a moving distance of the focus lens 211 are determined in accordance with a rotational direction and a rotational frequency of the AF actuator 71M, respectively.

The lens position detection section 25 includes an encode plate having a plurality of code patterns provided at a predetermined pitch in the light axis LT direction within a moving range of the lens group 21, and includes an encode brush that moves slidably on the encode plate together with the lenses, and thus detects a moving distance of the lens group 21 during adjustment of the focal point. It is to be noted that a lens position detected by the lens position detection section 25 is output in a form of a pulse number, for example.

The lens control section 26 includes a microcomputer having memories embedded therein, such as a ROM that stores, for example, a control program and a flash memory that stores data on status information.

In addition, the lens control section 26 has a communication function of communicating with the main control section 62 in the camera body 10 through the connector Ec. This allows transmission of, for example, status information data such as a focal distance of the lens group 21, a position of an exit pupil, an aperture value, a focusing distance, and the quantity of ambient light, and positional information of the focus lens 211 detected by the lens position detection section 25 to the main control section 62, and allows reception of, for example, data of the moving distance of the focus lens 211 from the main control section 62.

The aperture drive mechanism 27 receives driving force from an aperture drive actuator 76M through the coupler 75 to change an aperture diameter of the aperture 23.

(Electric Configuration of Main Body)

An electric configuration of the main body 10 is now described. The main body 10 includes the following components in addition to the image pickup device 1. Specifically, the main body 10 includes an analog frontend (AFE) 5, an image processing section 61, an image memory 65, the main control section 62, a flash circuit 63, an operation section 64, an image composition section 614, a power supply circuit 69, a battery 69B, a shutter drive control section 73A, a shutter drive actuator 73M, an aperture drive control section 76A, and the aperture drive actuator 76M.

Image pickup operation of the image pickup device 1, such as start and finish of exposure operation, selection of output from pixels, and read of a pixel signal, are controlled by a timing control circuit 51 described later.

The AFE 5 includes the timing control circuit 51, a signal processing section 52, and an A/D conversion section 53. The AFE 5 supplies timing pulses to the image pickup device 1 for predetermined operation. In addition, the AFE 5 performs predetermined signal processing to an image signal (analog signal) output from each pixel of the image pickup device 1, and converts the processed analog signal to a digital signal and then sends the digital signal to the image processing section 61.

The timing control circuit 51 generates predetermined timing pulses (such as a vertical scanning pulse $\phi Vn$, a horizontal scanning pulse $\phi Vm$, and a pulse for generation of a reset signal $\phi Vr$) on the basis of a reference clock output from the main control section 62, and sends the timing pulses to the image pickup device 1 to control the image pickup operation of the image pickup device 1. In addition, the timing control circuit 51 sends the predetermined timing pulses to the signal processing section 52 and to the A/D conversion section 53 to control operation of the signal processing section 52 and of the A/D conversion section 53.

The signal processing section 52 performs predetermined analog signal processing to analog image signals output from the image pickup device 1. The signal processing section 52 includes such as a correlated dual sampling (CDS) circuit, an auto gain control (AGC) circuit, and a clamp circuit. The A/D conversion section 53 converts analog image signals of R, G, and B output from the signal processing section 52 to digital image signals including a plurality of bits (for example, 12-bit signals) on the basis of the timing pulses output from the timing control circuit 51.

The image processing section 61 performs predetermined signal processing to image data output from the AFE 5 to create an image file, and includes such as a black level correction circuit 611, a white balance correction circuit 612, a gamma ($\gamma$) correction circuit 613, and an image composition section 614. It is to be noted that the image data captured into the image processing section 61 is temporarily written in the image memory 65 in synchronization with read of the image pickup device 1, and thereafter the image data written in the image memory 65 is accessed for processing in each block of the image processing section 61.

The black level correction circuit 611 corrects a black level of each of the digital image signals of R, G, and B subjected to A/D conversion by the A/D conversion section 53 into a reference black level.

The white balance control circuit 612 performs level conversion of the digital signals of color components of R, G, and B on the basis of a white reference depending on a light source (white balance (WB) adjustment). Specifically, the white balance correction circuit 612 specifies a portion of a photographic subject, which is estimated to be originally white from data of such as luminance and chromaticity, on the basis of WB adjustment data supplied from the main control section 62. Furthermore, the white balance correction circuit 612 obtains averages of respective color components of R, G, and B of that portion of the photographic subject, and obtains a G/R ratio and a G/B ratio, which are to be used as correction gains of R and B for level correction.

The gamma correction circuit 613 corrects gray-scale characteristics of the image signal (image data) subjected to the white balance adjustment. In detail, the gamma correction circuit 613 uses a gamma correction table, in which a level of image data is beforehand set for each of the color components, to perform nonlinear conversion and offset adjustment.

The image composition section 614 forms a composite image on the basis of a plurality of image data from the gamma correction circuit 613, and sends data of the composite image (composite image data) to the image memory 65. Formation of the composite image is described later in detail.

The image memory 65 temporarily holds the image data output from the image processing section 61 during a photographing mode, and is also used as a working region where the image data is subjected to predetermined processing by the main control section 62. In addition, the image memory 65 temporarily holds image data read from a memory card 67 during a reproduction mode.

The main control section 62 includes a ROM 621 storing, for example, a control program, and a microcomputer having a storage section including a RAM (not shown), which temporarily holds data, embedded therein, and generally controls operation of the sections of the image pickup unit.

The flash circuit 63 controls the amount of light emitted by the flash section 318 or an external flashlight connected to the connection terminal section 319 to the amount of emissive light set by the main control section 62, during a flash photographing mode.

The operation section 64 is provided to input operational information to the main control section 62. The operation section 64 includes, for example, the mode setting dial 305, the control value setting dial 306, the shutter button 307, the setting button group 312, the cross key 314, the push button 315, and the main switch 317.

The power supply circuit 69 includes, for example, a constant-voltage circuit, and generates a voltage that drives the overall image pickup unit including the control sections such as the main control section 62, the image pickup device 1, and other drive sections. Current application to the image pickup device 1 is controlled using a control signal supplied from the main control section 62 to the power supply circuit 69. The battery 69B, which includes a secondary battery such as a nickel metal hydride battery or a primary battery such as an alkaline battery, is a power source supplying power to the overall image pickup unit.

The shutter drive control section 73A generates a drive control signal for the shutter drive actuator 73M on the basis of a control signal supplied from the main control section 62. The shutter drive actuator 73M drives open/close operation of the shutter unit 40.

The aperture drive control section 76A generates a drive control signal for the aperture drive actuator 76M on the basis of a control signal supplied from the main control section 62. The aperture drive actuator 76M supplies driving force to the aperture drive mechanism 27 through the coupler 75.

[Photographing Operation of Image Pickup Unit]

Photographing operation of the image pickup unit is now described. The photographing operation is carried out under control of the main control section 62. In the image pickup unit, a photographer determines a pictorial composition with a live view image displayed on one or both of the LCD 311 and the EVF 316 provided on the back of the main body 10. Specifically, the photographer determines a direction of the image pickup lens 2 such that a main photographic subject (for example, a person) as a photographing object is shown in the live view image. The live view image is formed by sequentially reproducing a plurality of images that are sequentially acquired by the image pickup device 1 through the image pickup lens 2. After determining the pictorial composition, the photographer depresses the shutter button 307 into the halfway depressed state, activating preparation operation for photographing of a still image of the photographic subject (preparation operation such as setting of an exposure control value and detection of a focal point). Here, the focusing control section (not shown) of the main control section 62 and the focus control drive section 71A cooperatively drive the lens drive mechanism 24 to adjust a position of the focus lens 211 such that the main photographic subject is in a focusing state. The focusing state is detected using a plurality of AF sensors (not shown) of a phase difference type, for example. After the main photographic subject is in the focusing state, the photographer depresses the shutter button 307 into the fully depressed state, activating photographing operation. Specifically, the image pickup device 1 receives light arrived from the photographic subject through the image pickup lens 2, and sends image signals (analog signals) corresponding to a photographic subject image including the main photographic subject to the signal processing section 52. Thereafter, the image signals are passed from the signal processing section 52 through the A/D conversion section 53 and thus converted into digital signals, and then sent to the image processing section 61. The image signals received by the image processing section 61 are sent to the image composition section 614 from the black level correction circuit 611 through the white balance correction circuit 612 and the gamma (γ) correction circuit 613 in order. The image composition section 614 combines an image based on image signals derived from the wide-opening pixels 31 with an image based on image signals derived from the narrow-opening pixels 32 to form one composite image. The composite image is temporarily held in the image memory 65.

[Image Composition Processing]

Figure 7:
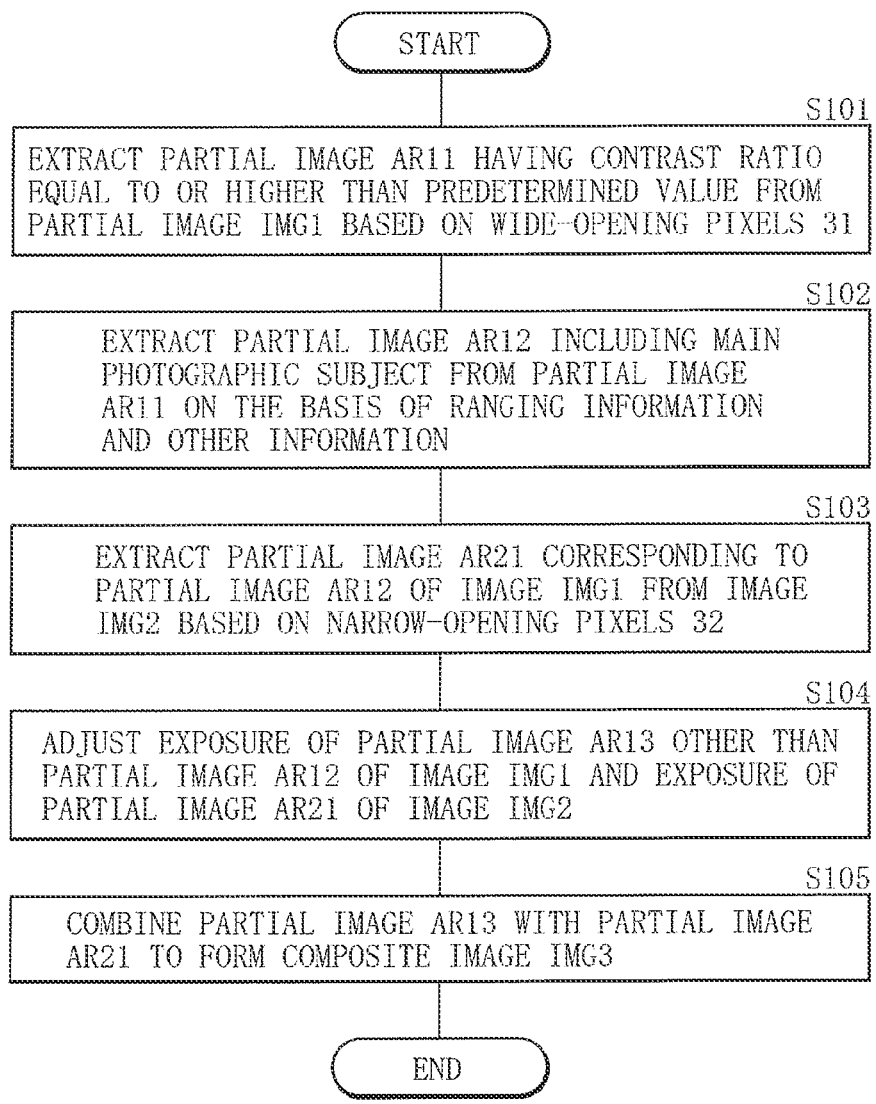
FIG. 7 is a flowchart explaining a flow of image composition processing by an image composition section.
Figure 8:
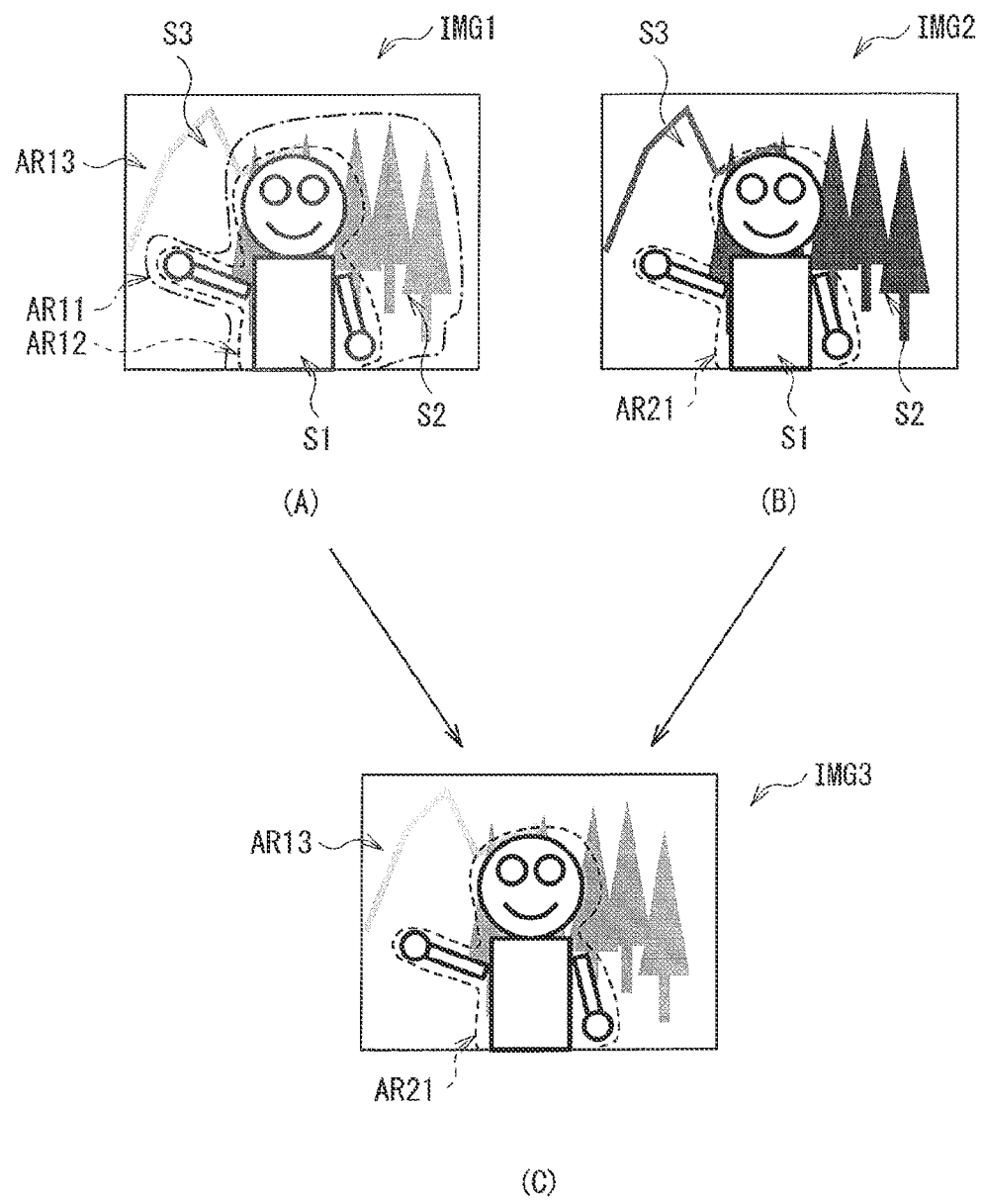
FIG. 8 is a conceptual diagram explaining the image composition processing by the image composition section.

Image composition processing by the image composition section 614 is now described with reference to FIGS. 7 and 8. FIG. 7 is a flowchart explaining a flow of image composition processing by the image composition section 614. FIG. 8 is a conceptual diagram explaining the image composition processing. In detail, (A) of FIG. 8 shows an exemplary image IMG1 based on only image signals derived from the wide-opening pixels 31 (pixels R1, G1, and B1). (B) of FIG. 8 shows an exemplary image IMG2 based on image signals derived from the wide-opening pixels 31 (pixels R1 and B1) and image signals derived from the narrow-opening pixels 32 (pixel G2). (C) of FIG. 8 shows a composite image IMG3 formed by composing part of the image IMG1 and part of the image IMG2. The image signals generating the image IMG1 and the image signals generating the image IMG2 are simultaneously captured by the wide-opening pixels 31 and the narrow-opening pixel 32.

The image composition section 614 first extracts a partial image AR11 having a contrast ratio equal to or higher than a predetermined value from the image IMG1 shown in (A) of FIG. 8 (step S101). The image IMG1 in (A) of FIG. 8 includes a person image S1 as a main photographic subject, a grove image S2, and a mountain image S3 in order of closeness to the image pickup unit. Since focusing control is performed such that the person image S1 is in a focusing state, a contrast ratio is reduced in order of the person image S1, the grove image S2, and the mountain image S3. As a result, the partial image AR11 including, for example, the person image S1 and the grove image S2 is extracted in step S101.

A partial image AR12 including the person image S1 serving as the main photographic subject ((A) of FIG. 8) is then extracted from the partial image AR11 of the image IMG1 on the basis of the contrast ratio (step S102). At that time, the person image S1 as the main photographic subject may be identified on the basis of such as facial recognition information and ranging information used for detection of the focusing state. In addition, the partial image AR12 may be directly extracted from the image IMG1 in step S101.

A partial image AR21 corresponding to the partial image AR12 of the image IMG1 is then extracted from the image IMG2 shown in (B) of FIG. 8 (step S103). The image IMG2 in (B) of FIG. 8 also includes the person image S1 serving as the main photographic subject, the grove image S2, and the mountain image S3.

Exposure of a partial image AR13 occupying regions other than the partial image AR12 of the image IMG1 and exposure of the partial image AR21 of the image IMG2 are then adjusted as necessary (step S104). In detail, since the opening 14K2 is smaller than the opening 14K1, the narrow-opening pixel 32 (the pixel G2) receives a less amount of light compared with the wide-opening pixel 31 (the pixel R1 or B1). It is therefore preferable, but not strictly required, that the gain be adjusted or increased for the narrow-opening pixel 32.

Finally, the partial image AR13 is combined with the partial image AR21 to form a composite image. This is the end of the image composition processing by the image composition section 614 (step S105).

[Effects of Embodiment]

In this way, the image pickup device of the embodiment includes the wide-opening pixels 31 each having the opening 14K1 and the narrow-opening pixels 32 each having the opening 14K2 different in size from the opening 14K1, and includes the image composition section 614. As a result, the wide-opening pixels 31 capture incident beams having relatively large converging angles, and the narrow-opening pixels 32 capture incident beams having relatively small converging angles. Furthermore, the image composition section 614 combines the partial image AR13 based on only the image signals derived from the wide-opening pixels 31 with the partial image AR21 including the image signals derived from the narrow-opening pixels 32 to form one composite image IMG3. This results in a composite image as a combination of a background image having a shallow depth of field and an image of a main photographic subject which has a deep depth of field and is successfully subjected to aberration correction. Specifically, a significantly blurred background image is combined with a clear image of the main photographic subject, achieving a photographing expression that allows the main photographic subject to be emphasized.

In addition, the image pickup device 1 also substantially performs aberration correction, resulting in relaxation of a level of aberration correction (at full aperture) of the image pickup lens 2. This improves design flexibility of the image pickup lens 2, leading to simplification of a structure, including a decrease in the number of lenses for aberration correction and a spherical surface being available instead of an aspheric surface.

In addition, in the image pickup unit according to the embodiment, a difference in exposure occurring between the wide-opening pixels 31 and the narrow-opening pixels 32 is used instead of performing adjustment of exposure, allowing collective acquisition of images in a wide dynamic range. Specifically, a partial image (high-luminance-region image) corresponding to a relatively bright photographic subject is extracted from an image based on image signals derived from the wide-opening pixels 31, and concurrently a partial image (low-luminance-region image) corresponding to a relatively dark photographic subject is extracted from an image based on image signals derived from the narrow-opening pixels 32. Such partial images are combined, achieving a composite image with a wide dynamic range of luminance. As a result, a composite image, in which so-called blown-out-highlights and blocked-up-shadows are relatively few, is captured at a time, allowing recording of a video with a wide dynamic range of luminance, which has been hard to be achieved in the past.

Figure 9:
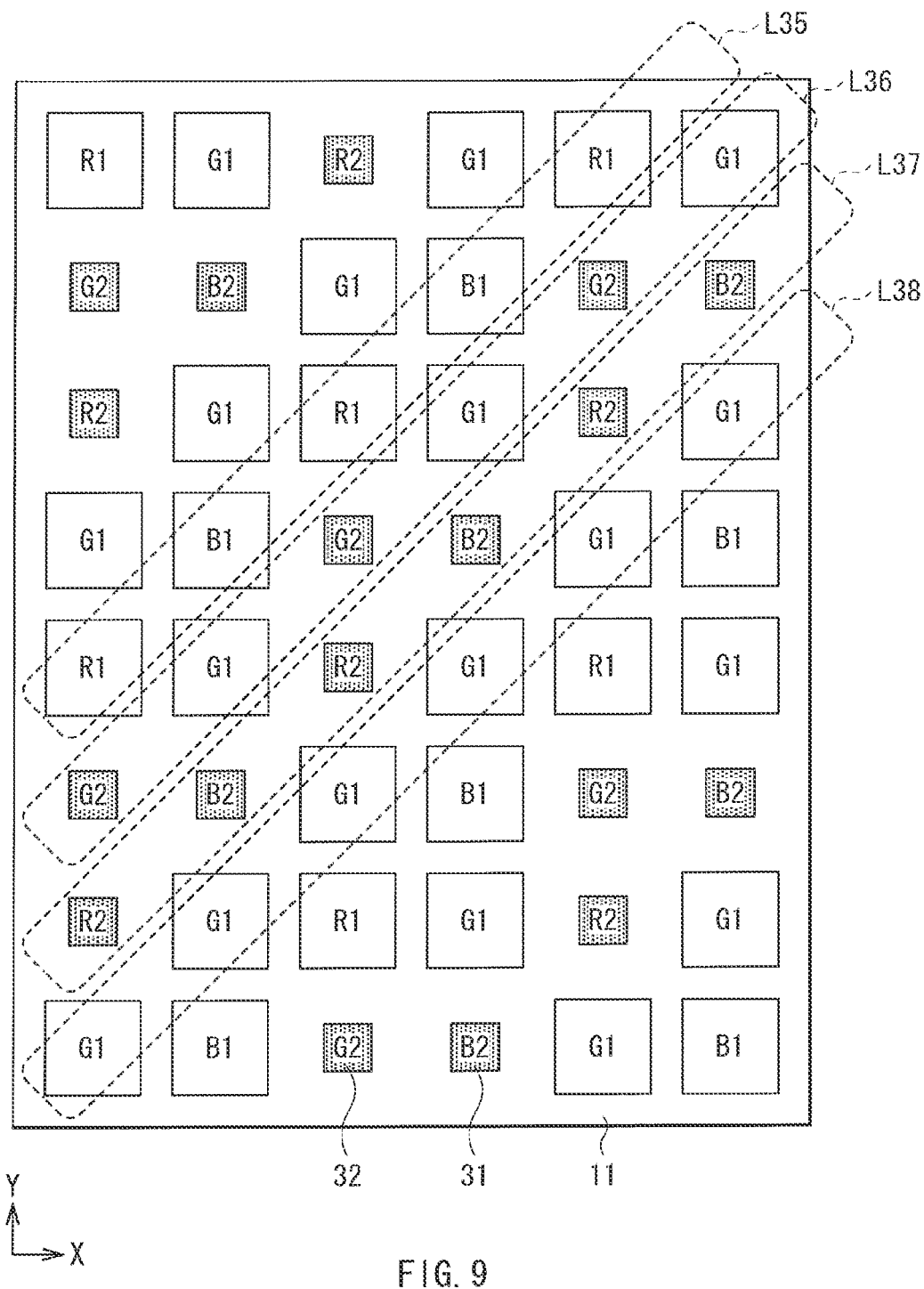
FIG. 9 is a plan diagram illustrating a first modification of the pixel arrangement in the image pickup device.
Figure 10:
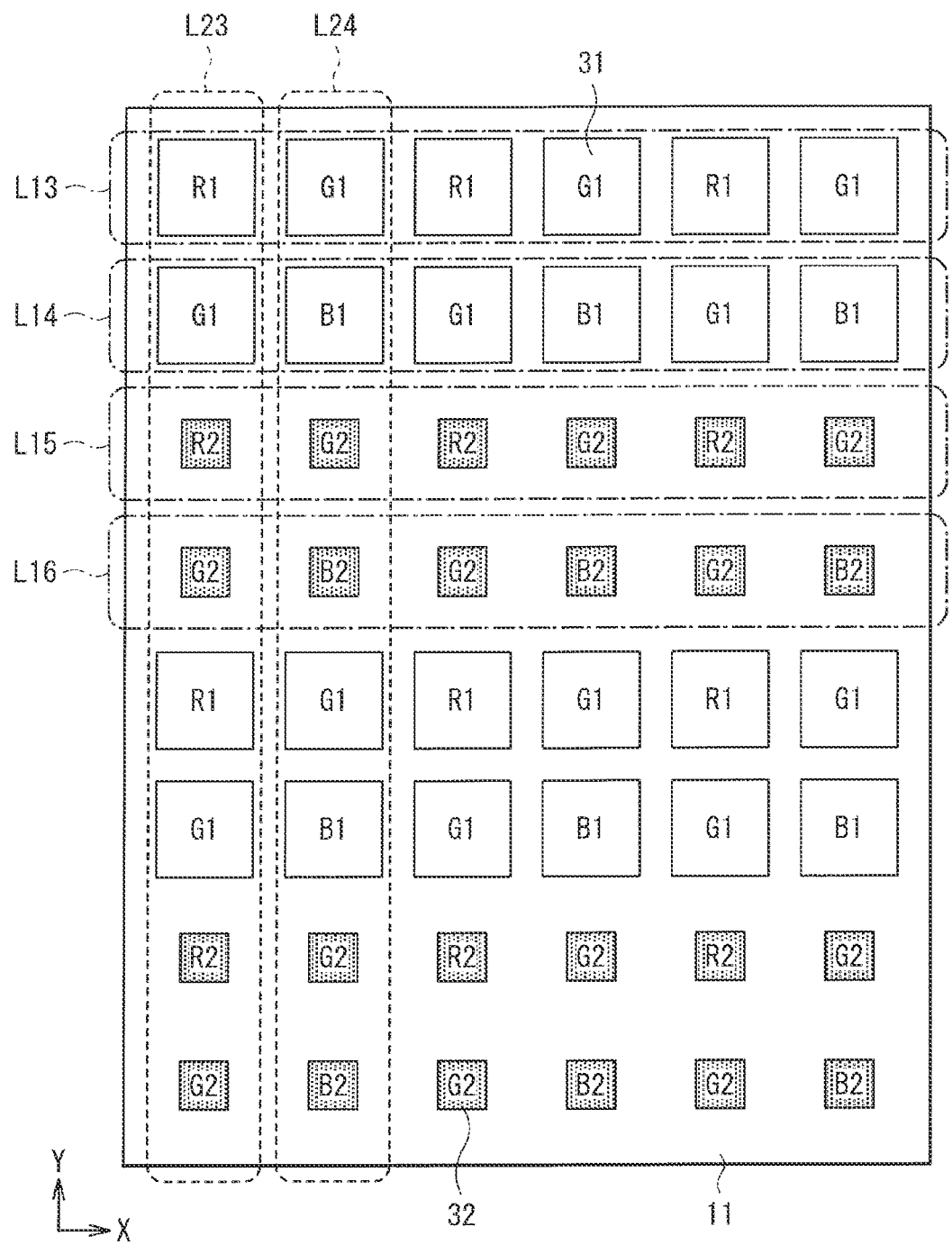
FIG. 10 is a plan diagram illustrating a second modification of the pixel arrangement in the image pickup device.
Figure 11:
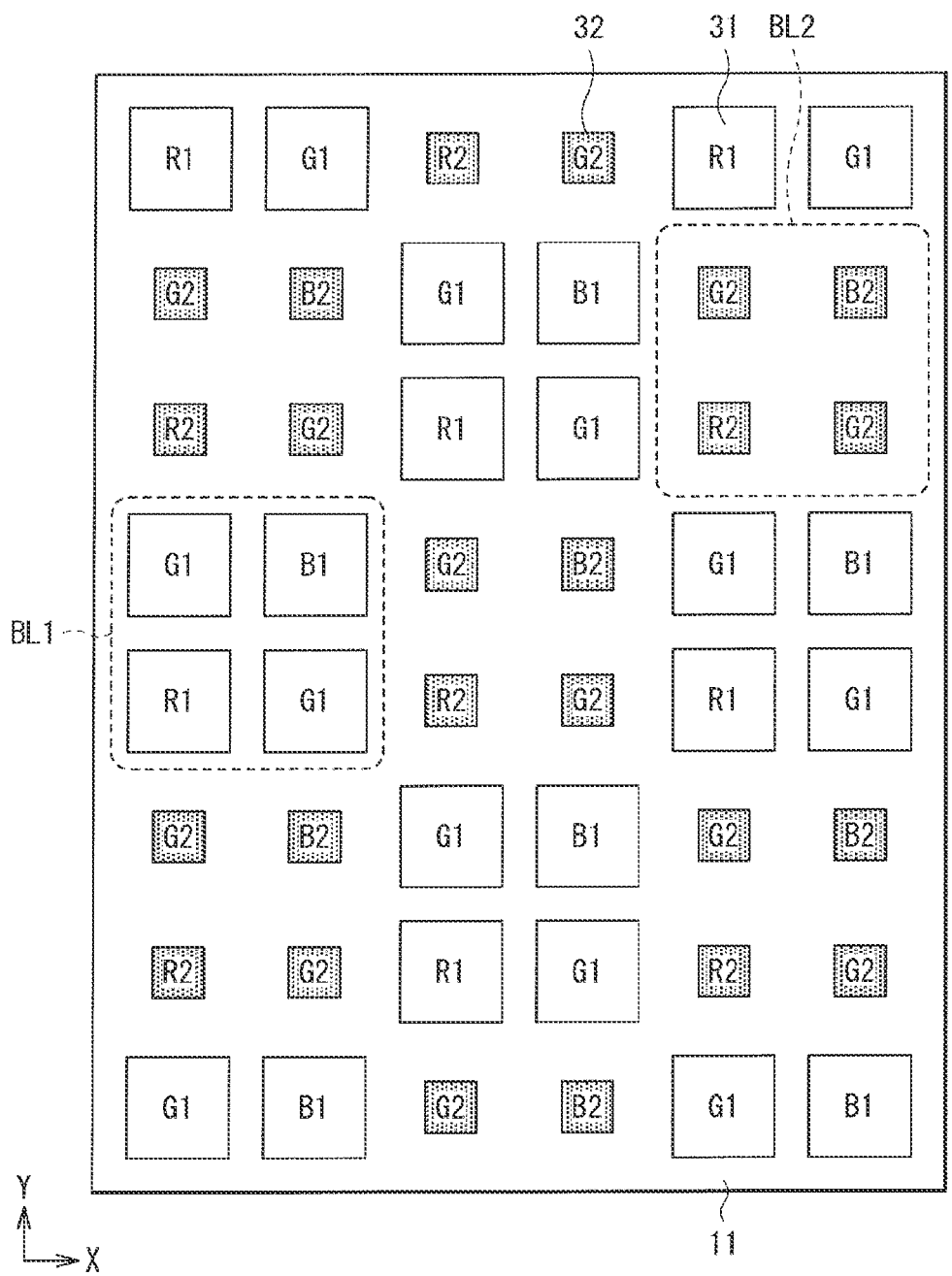
FIG. 11 is a plan diagram illustrating a third modification of the pixel arrangement in the image pickup device.

While the present technology has been described with the embodiment hereinbefore, various modifications or alterations of the embodiment may be made without any limitation. For example, the pixels (pixels G2) outputting image signals corresponding to light of a green component are provided as the second pixels (the narrow-opening pixels 32) in the embodiment. In the present technology, however, respective pixels (pixels R2 and B2) outputting image signals corresponding to light of red and blue components may be provided as the second pixels (the narrow-opening pixels 32), for example, as shown in FIGS. 9 to 11. FIGS. 9 to 11 each illustrate a pixel arrangement as the so-called Bayer arrangement, as in FIGS. 5A and 5B.

In detail, in FIG. 9, pixel arrays L35, L36, L37, and L38, each extending in a diagonally right-up direction inclined with respect to each of the X and Y directions, are sequentially arranged in a diagonally left-up direction orthogonal to the extending direction. In the pixel array L35, pixels R1 and pixels B1 are alternately arranged along the diagonally right-up direction. In the pixel array L36, pixels G1 and pixels G2 are alternately arranged along the diagonally right-up direction. In the pixel array L37, pixels R2 and pixels B2 are alternately arranged along the diagonally right-up direction. In the pixel array L38, a plurality of pixels G1 are arranged along the diagonally right-up direction.

In FIG. 10, pixel arrays L13, L14, L15, and L16, each extending in the X direction, are sequentially arranged in the Y direction. In the pixel array L13, a plurality of pixels R1 and a plurality of pixels G1 are alternately arranged in the X direction. In the pixel array L14, a plurality of pixels G1 and a plurality of pixels B1 are alternately arranged in the X direction. In the pixel array L15, a plurality of pixels R2 and a plurality of pixels G2 are alternately arranged in the X direction. In the pixel array L16, a plurality of pixels G2 and a plurality of pixels B2 are alternately arranged in the X direction. The pixels R1 and R2 in the pixel arrays L13 and L15 adjoin the pixels G1 and G2 in the pixel arrays L14 and L16, respectively, in the Y direction. Specifically, pixel arrays L23, in each of which pixels R1, G1, R2, and G2 are arranged in this order in the Y direction, and pixel arrays L24, in each of which pixels G1, B1, G2, and B2 are arranged in this order in the Y direction, are alternately arranged in the X direction.

In FIG. 11, pixel blocks BL1 and pixel blocks BL2 are arranged so as to form a checkered pattern. Each pixel block BL1 includes one pixel R1, one pixel B1, and two pixels G1. Each pixel block BL2 includes one pixel R2, one pixel B2, and two pixels G2. It is to be noted that the number of the wide-opening pixels 31 is the same as the number of the narrow-opening pixels 32 in each pixel arrangement of FIGS. 10 and 11. In addition, a number ratio between the pixels R1, G1, and B1 is 1:2:1, and a number ratio between the pixels R2, G2, and B2 is also 1:2:1.

Moreover, pixels 41 and 42 as AF (Automatic Focus) sensors may be disposed together with the wide-opening pixels 31 and the narrow-opening pixels 32 on the substrate 11 of the image pickup device 1, for example, as shown in FIGS. 12A to 12C. The pixels 41 and 42 are phase-difference-type AF sensors used for detecting a focusing state. The pixels 41 are AF sensors used for detecting a phase difference in the Y direction, and classified into two types of pixels 41A and 41B each having an opening 41K shifted in the Y direction from the center of a light receiving region (photoelectric conversion portion). On the other hand, the pixels 42 are AF sensors used for detecting a phase difference in the X direction, and classified into two types of pixels 42A and 42B each having an opening 42K shifted in the X direction from the center of a light receiving region. For actually detecting the focusing state, a set of the pixels 41A and 41B are used to detect the phase difference in the Y direction, and a set of the pixels 42A and 42B are used to detect the phase difference in the X direction. It is to be noted that the pixels 41A and 41B are structurally different from the wide-opening pixel 31 and the narrow-opening pixel 32 in that the center of each of the openings 41K and 42K is deviated from the center of the light receiving region (photoelectric conversion portion), and a color filter is unnecessary. FIGS. 12A to 12C illustrate examples where pixel arrays L41 including the pixels 41A and 41B and pixel arrays L42 including the pixels 42A and 42B are appropriately included in the pixel arrangements shown in FIGS. 9, 10, and 5A, respectively.

Figure 13:
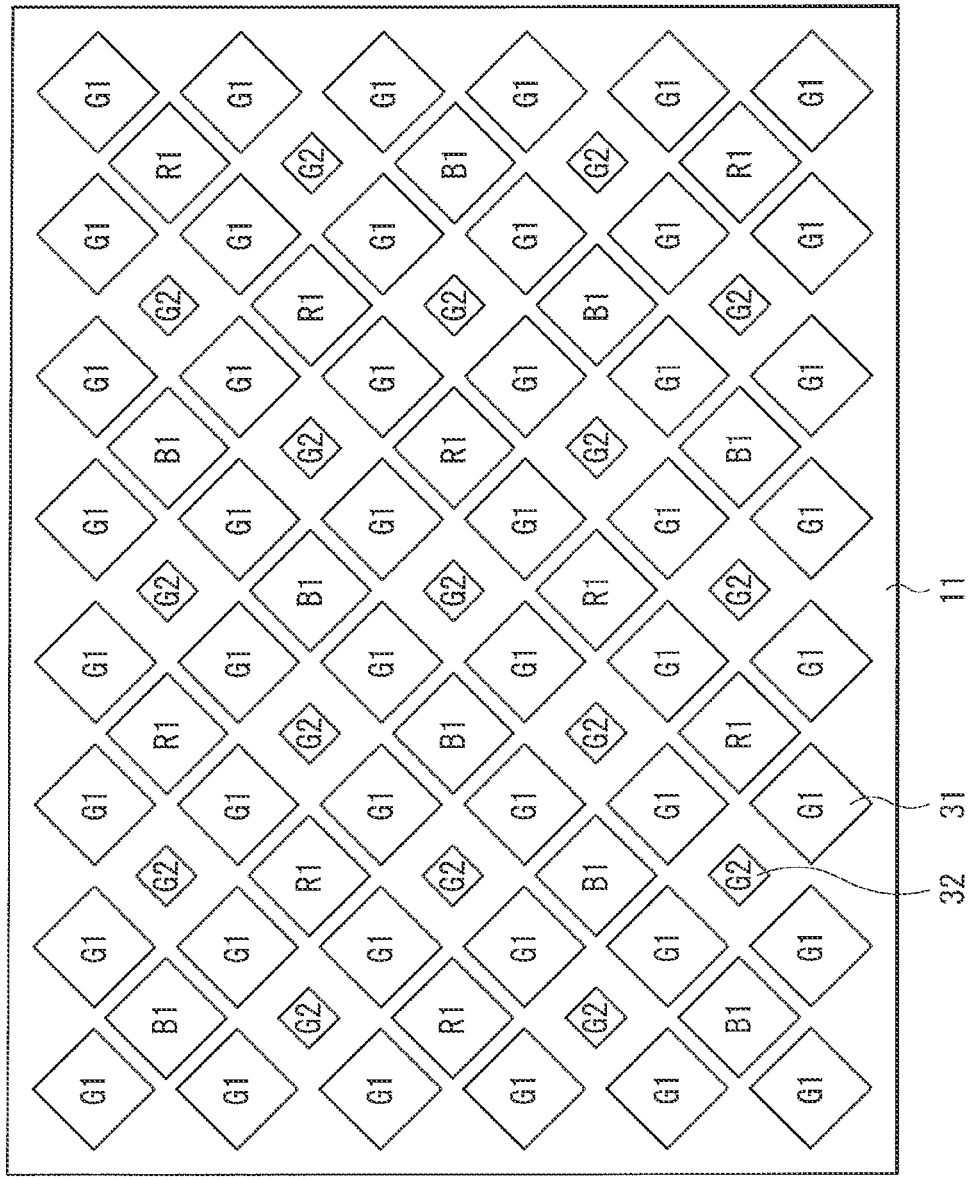
FIG. 13 is a plan diagram illustrating a fifth modification of the pixel arrangement in the image pickup device.

Although the embodiment has been described with the exemplary pixel arrangement as the so-called Bayer arrangement, the present technology is not limited to this. For example, the pixel arrangement may have a clear bit pattern as shown in FIG. 13. In such a pixel arrangement, the wide-opening pixels 31 (pixels R1, G1, and B1) and the narrow-opening pixels 32 (pixels G2) are also provided, achieving the same effects as in the embodiment.

In addition, although one image pickup device having both the wide-opening pixels and the narrow-opening pixels on the same substrate is used in the embodiment, the present technology is not limited to this. For example, a semi-transmissive mirror (an optical component without wavelength selectivity having a property of transmitting a part of incident light L1 and reflecting another part thereof) 81 may be used to split a beam L1 from the image pickup lens 2 so that image pickup is performed by two image pickup devices 1A and 1B. Here, for example, the image pickup device 1A may have only the wide-opening pixels, and the image pickup device 1B may have only the narrow-opening pixels or have both the wide-opening pixels and the narrow-opening pixels.

Figure 14:
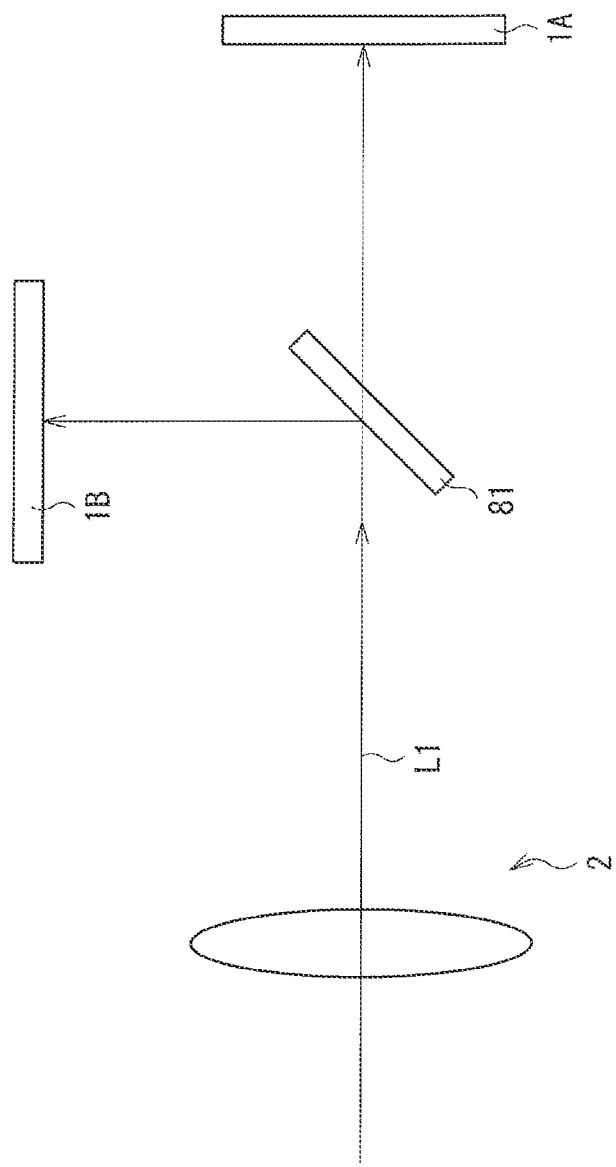
FIG. 14 is a conceptual diagram illustrating a modification of the image pickup unit shown in FIG. 1.

In addition, exposure is adjusted through gain adjustment in the embodiment. However, for example, a shutter unit may be provided in front (on a side closer to an object) of the image pickup device 1A in the example of FIG. 14 so that an open period of the shutter unit is adjusted to change exposure time for adjustment of exposure, instead of the gain adjustment. Such adjustment of exposure time may be combined with the gain adjustment.

Although the embodiment has been described with the image pickup device including the two types of pixels (the wide-opening pixels and the narrow-opening pixels) between which areas of the openings of the light-shielding portions are different, the present technology is not limited to this. For example, an image pickup device including three or more types of pixels, among which areas of openings of light-shielding portions are different, may be used.

It is to be noted that although the embodiment has been described with the image pickup device performing image composition with the image composition section 614, the image pickup device may perform typical photographing through selection of photographing modes without such image composition. In such a case, image data from the gamma correction circuit 613 may be directly sent to the image memory 65 without being passed through the image composition section 614.

Thus, it is possible to achieve at least the following configurations from the above-described example embodiments and the modifications of the disclosure.

(1) An image pickup unit, including:
a first pixel including a first light-shielding portion and a first light-receiving portion in order from an object, the first pixel outputting a first image signal, and the first light-shielding portion including a first opening;
a second pixel including a second light-shielding portion and a second light-receiving portion in order from the object, the second pixel outputting a second image signal, and the second light-shielding portion including a second opening having area smaller than area of the first opening; and
a composition section combining a first image based on the first image signal with a second image based on the second image signal to form a composite image.

(2) The image pickup unit according to (1), wherein the second pixel includes a green pixel receiving green light, and
the first pixel includes a red pixel receiving red light and a blue pixel receiving blue light.

(3) The image pickup unit according to (1) or (2), wherein the second pixel includes a first green pixel receiving green light, and
the first pixel includes a red pixel receiving red light, a blue pixel receiving blue light, and a second green pixel receiving the green light.

(4) The image pickup unit according to any one of (1) to (3), wherein the composition section combines a photographic subject image extracted from the second image with a background image extracted from the first image.

(5) The image pickup unit according to any one of (1) to (4), wherein the composition section combines a high-luminance-region image extracted from the second image with a low-luminance-region image extracted from the first image.

(6) The image pickup unit according to any one of (1) to (5), wherein the first pixel and the second pixel are provided on a same substrate.

(7) The image pickup unit according to any one of (1) to (6), wherein the second light-receiving portion is disposed in a region where a center of the second light-receiving portion is overlapped with the second opening.

(8) The image pickup unit according to any one of (1) to (7), further including:
a first light-receiving device including a third light-shielding portion and a third light-receiving portion in order from the object, the third light-shielding portion including a third opening, and the third light-receiving portion being provided eccentrically with respect to the third opening in a first direction; and
a second light-receiving device including a fourth light-shielding portion and a fourth light-receiving portion in order from the object, the fourth light-shielding portion including a fourth opening, and the fourth light-receiving portion being provided eccentrically with respect to the fourth opening in a second direction opposite to the first direction.

(9) An image pickup device, including:
a first pixel including a first light-shielding portion and a first light-receiving portion in order from an object, the first pixel outputting a first image signal, and the first light-shielding portion including a first opening; and
a second pixel including a second light-shielding portion and a second light-receiving portion in order from the object, the second pixel outputting a second image signal, and the second light-shielding portion including a second opening having area smaller than area of the first opening.

The present disclosure contains subject matter related to that disclosed in Japanese Priority Patent Application JP 2011-089432 filed in the Japan Patent Office on Apr. 13, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup unit, comprising:
   a first pixel including a first light-shielding portion and a first light-receiving portion in order from an object, the first pixel outputting a first image signal, and the first light-shielding portion including a first opening;
   a second pixel including a second light-shielding portion and a second light-receiving portion in order from the object, the second pixel outputting a second image signal, and the second light-shielding portion including a second opening having area smaller than area of the first opening; and
   a composition section combining a first image based on the first image signal with a second image based on the second image signal to form a composite image,
   wherein the composition section combines a photographic subject image extracted from the second image with a background image extracted from the first image to form the composite image.

2. The image pickup unit according to claim 1, wherein the second pixel includes a green pixel receiving green light, and the first pixel includes a red pixel receiving red light and a blue pixel receiving blue light.

3. The image pickup unit according to claim 1, wherein the second pixel includes a first green pixel receiving green light, and
   the first pixel includes a red pixel receiving red light, a blue pixel receiving blue light, and a second green pixel receiving the green light.

4. The image pickup unit according to claim 1, wherein the composition section combines a high-luminance-region image extracted from the first image with a low-luminance-region image extracted from the second image.

5. The image pickup unit according to claim 1, wherein the first pixel and the second pixel are provided on a same substrate.

6. The image pickup unit according to claim 1, wherein the second light-receiving portion is disposed in a region where a center of the second light-receiving portion is overlapped with the second opening.

7. The image pickup unit according to claim 1, further comprising:
   a first light-receiving device including a third light-shielding portion and a third light-receiving portion in order from the object, the third light-shielding portion including a third opening, and the third light-receiving portion being provided eccentrically with respect to the third opening in a first direction; and
   a second light-receiving device including a fourth light-shielding portion and a fourth light-receiving portion in order from the object, the fourth light-shielding portion including a fourth opening, and the fourth light-receiving portion being provided eccentrically with respect to the fourth opening in a second direction opposite to the first direction.

8. An image pickup device, comprising:
   a first pixel including a first light-shielding portion and a first light-receiving portion in order from an object, the first pixel outputting a first image, and the first light-shielding portion including a first opening; and
   a second pixel including a second light-shielding portion and a second light-receiving portion in order from the object, the second pixel outputting a second image, and the second light-shielding portion including a second opening having area smaller than area of the first opening,
   wherein a high-luminance-region image extracted from the first image is combined with a low-luminance-region image extracted from the second image to form a composite image.

* * * * *